Jan. 16, 1968    C. J. DAVIS    3,363,423
UNDERGROUND CABLE LAYING IMPLEMENT
Filed Dec. 20, 1965    2 Sheets-Sheet 1

CHARLES J. DAVIS
INVENTOR.

BY *Hubert Miller*

ATTORNEY

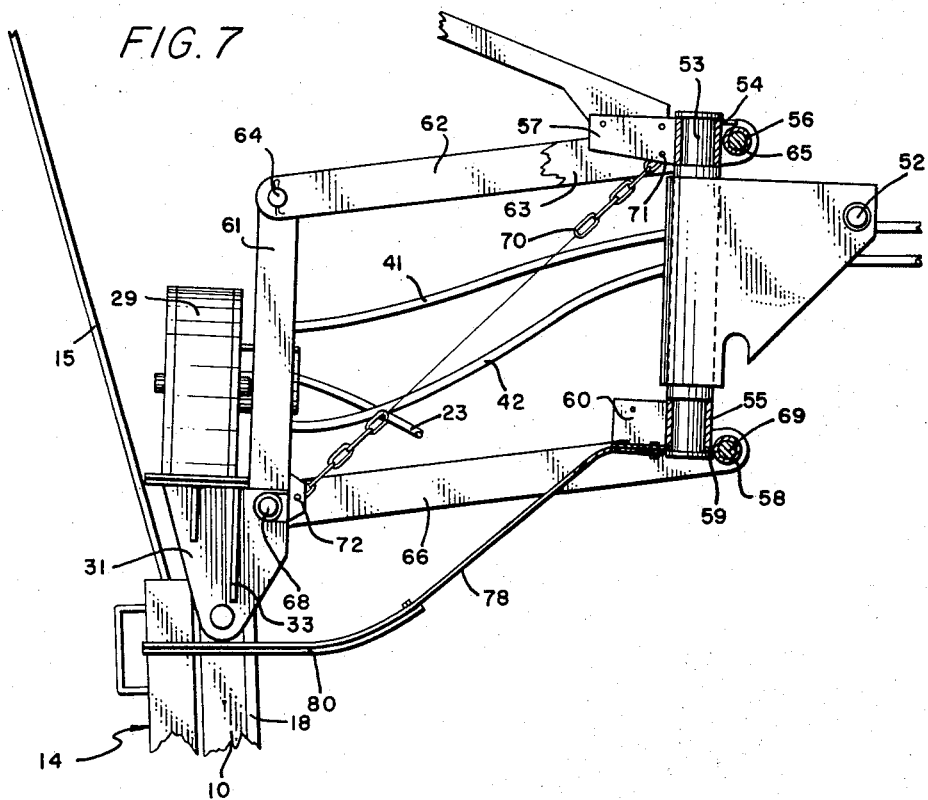

United States Patent Office 3,363,423
Patented Jan. 16, 1968

3,363,423
UNDERGROUND CABLE LAYING IMPLEMENT
Charles J. Davis, 22 Colonial, Wichita, Kans. 67207
Filed Dec. 20, 1965, Ser. No. 514,770
6 Claims. (Cl. 61—72.6)

ABSTRACT OF THE DISCLOSURE

A vehicle supported power actuated device which utilizes an elongated, thin, flat generally upright, rapidly reciprocated blade to form a deep, narrow continuous slit in the ground, and which simultaneously lays a continuous length of cable along the bottom of the blade-formed slit by means of an elongated, thin, flat cable feeder and guide secured substantially parallel to and along the trailing edge of the blade by means of longitudinally spaced links which are pivoted freely at their respective opposite ends both to the blade and to the cable feeder, thus permitting the blade to be rapidly reciprocated without causing a corresponding reciprocation of the cable feeder.

---

This invention relates to an improved implement for laying a continuous length of cable or other similar flexible element along a desired route, and at a desired predetermined depth beneath the ground surface.

A conventional method of performing the above operation involves using a powered trench digging machine to dig a trench to the desired depth and along the desired route, laying the cable by hand along the bottom of the trench, and filling the trench with a bulldozer or other powered machine.

Another method has recently been tried but has not proven satisfactory because of damage to the cable. This involves use of a vehicle supported power reciprocated blade for forming a continuous slit in the ground instead of a relatively wider trench, and simultaneously feeding the cable downward into the bottom of the slit along a cable guide which is rigidly connected to and supported along the trailing edge of the reciprocating ground slitting blade. The fault in this method is that the blade necessarily is reciprocated at high frequency, and the blade vibrations or reciprocatory movements are transmitted directly through the cable guide to the cable as it passes through the guide, resulting in breakage and cracking of the thin, continuous, sheet metal sheath which underlies the much thicker flexible cable insulation. When this metal sheath is broken or cracked, it is considered unusable.

It is a primary object of this invention to provide an implement which is adapted to be mounted on any self-propelled vehicle, and which is capable of forming a continuous cable width slit in the ground, and of simultaneously laying a continuous length of cable along the bottom of the blade-formed slit without transmitting blade vibrations or reciprocatory movements to the cable, and consequently without any damage to the sheet metal sheath which constitutes a part of the moisture proof exterior cable insulation.

An additional object of the invention is to provide an implement of the type mentioned which prevents dirt from being pulled upward out of the slit being formed, by the reciprocating blade, and deposited on the ground surface alongside the slit, thus eliminating the necessity of a second ordinarily required operation of moving loose dirt from along both sides of the cable slit into the slit.

Another object is to provide an implement which includes a means for lubricating the side surfaces of the reciprocating blade as it performs its ground slitting function, thus not only reducing the power required for reciprocating the blade, but also greatly reducing the tendency of the blade to eject chunks or clods of dirt from the ground slit being formed, especially when the slitting function is being formed in sticky clay soil.

Construction and operation of the invention will be more clearly understood when the following description is read in connection with the accompanying drawings, in which:

FIG. 7 is an enlarged side elevation of a portion of the implement shown in FIG. 1, with parts removed and parts in section to show details of construction.

Figure 1:
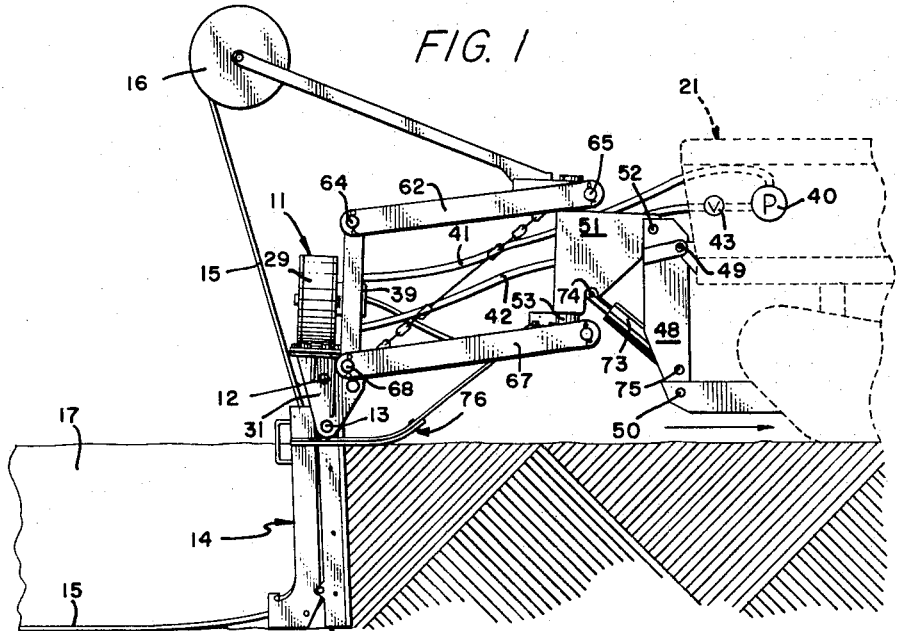
FIG. 1 is a side elevational view of an implement embodying my invention, shown suspended from one end of a small track type vehicle, the blade being shown in operating position, and the ground in which the blade is making a slit being shown in section.

Referring to FIG. 1, the illustrated implement generally includes: a flat elongated ground slitting blade 10; a power driven blade reciprocating mechanism 11, which is operably connected to the upper end of blade 10 by heavy pins or bolts 12 and 13, and which serves to maintain the blade in a generally upright ground slitting position, as shown in FIG. 1, during its ground slitting operation; a cable guide and feeder 14 through which the cable 15 is fed from a storage drum 16 into and along the bottom of the ground slit 17, as the slit is formed by the blade; a means for movably securing cable guide 14 in a generally parallel blade trailing position along that edge of the blade remote from its ground slitting edge 18, such means being shown as two pairs of short links 19 and 20, each pair pivotally connected at one end to the blade and at the other end to the guide, such securing means thus affording free reciprocatory movement for the blade 10 without transmitting any similar movement to guide 14 or the cable during the ground slitting and cable laying operation; and means connected to and movably suspending the entire above described assembly from a suitable self-propelled vehicle, in this case a small track-type tractor 21.

Figure 2:
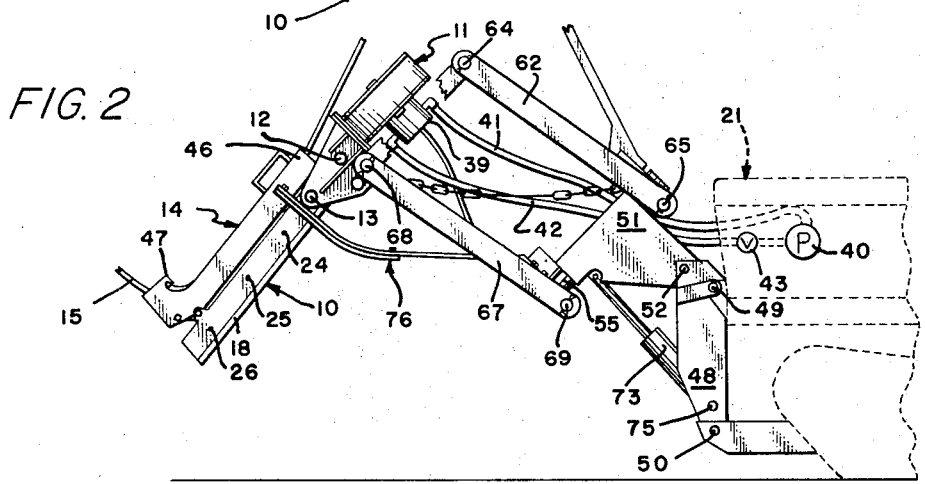
FIG. 2 is a view similar to FIG. 1 with the implement elevated into transporting position.
Figures 3, 4, 5:
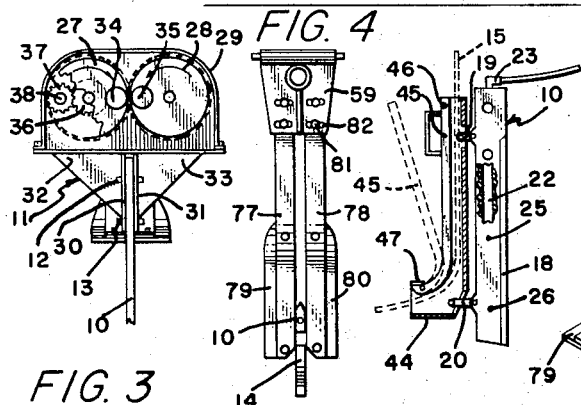
FIG. 3 is a rear view of a preferred type of blade reciprocating mechanism, the blade being shown only fragmentarily, and the cover plate of the mechanism having been removed to expose internal parts.
FIGS. 4 and 6 are top plan and perspective views, respectively, of a ground presser foot which cooperates with the blade as it forms a slit in the ground.
FIG. 5 is a side elevation, with parts in section of the blade and cable guide assembly, which constitutes an important part of the invention.
Figure 6:
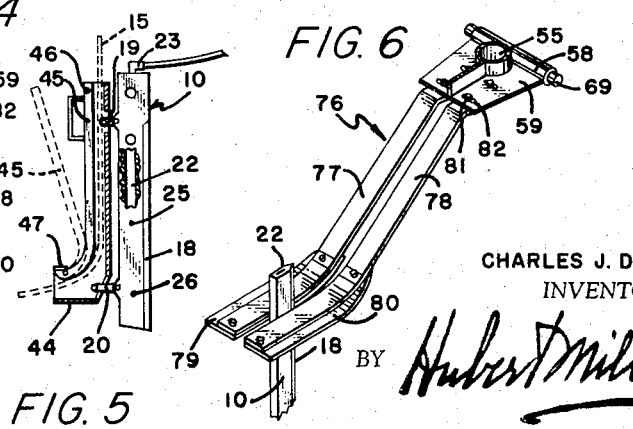

Referring more particularly to the preferred construction details of the above named major components, in the order of their recitation, the blade shape can be more clearly seen in FIGS. 4 and 6. It has flat sides and one of its long edges is in the form of a ground cutting edge 18. The thickness of the blade is substantially the same as the diameter of the cable to be laid. The blade is provided with a longitudinal duct 22, a hose fitting 23 through which a lubricant, such as water, may be forced into the duct 22, and outlet ports 24, 25 and 26 (FIG. 2), through which lubricant is discharged against the walls of the ground slit as the blade forms the slit.

Although different types of blade reciprocating mechanisms may be used, the preferred type, illustrated in FIG. 3, includes a pair of heavy meshed gears 27 and 28, suitably journaled in a housing 29. A pair of heavy, spaced parallel, depending plates 30 and 31 are rigidly secured centrally to the bottom of housing 29, and are stabilized by triangular gusset plates 32 and 33, likewise welded to the housing bottom and to the respective plates. The upper end of blade 10 is rigidly secured to this reciprocating mechanism by the pins or bolts 12 and 13 passing through the plates 30 and 31 and through the upper end of the blade positioned between them.

The gears 27 and 28 carry fixed correspondingly located eccentric weights 34 and 35, as shown. One gear, 27, carries an integral, smaller concentric gear 36 which meshes with a gear 37 which is fixed on the drive shaft 38 of a motor 39 (FIGS. 1 and 2), which is bolted to the front plate of the housing. Drive shaft 38 extends through the housing front plate and drive gear 37 is positioned within housing 29.

It will be seen that when eccentric weights 34 and 35 reach the relative positions shown in FIG. 3, and with the gears 27 and 28 rotating at relatively high speed, a strong downward thrust and movement will be transmitted to blade 10. Likewise when the weights reach their respective opposite positions, 180° from the positions shown, a strong upward thrust and movement will be transmitted to blade 10. The length of the reciprocatory stroke of the blade will depend on the mass of the eccentric weights, their rate of rotation, and the mass of the housing and blade assembly. In the case shown motor 39 is driven by fluid under pressure, the source of fluid under pressure being a driven pump 40 carried by the vehicle 21, and connected to the motor by delivery and return conduits 41 and 42 through a control valve 43.

Cable guide 14 (FIG. 5) is of channel section sheet metal with the internal width of the channel being slightly greater than the diameter of the cable to be laid, which makes its outside thickness slightly greater than the thickness of blade 10. The length of guide 14 is slightly less than the length of blade 10, and the lower end of the guide has a short wall 44 (FIG. 5) which is disposed at 90° to the channel bottom wall. An elongated narrow filler 45 has a curved lower end which serves to close the open part of the channel of the guide throughout its length, leaving a passageway of ample dimensions for the cable to freely slide through. The filler is removable from the channel by means of pins 46 and 47. When the pairs of connecting links 19 and 20 (FIG. 5) are pivoted downward by the weight of the guide, as shown in FIGS. 1 and 2, the end wall 44 of the guide lies in a plane substantially common to the plane in which the lower end of blade 10 lies at the end of the blade downstroke, so that end wall 44 literally slides along the bottom of the slit 17.

The means for suspending the entire implement from a vehicle includes (FIGS. 2 and 7):

A pair of heavy, laterally spaced upright plates 48, rigidly secured to the vehicle by pins 49 and 50;

A rigid box section element 51 having one end pivotally connected between the upper ends of plates 48 by a transverse pivot pin 52, and having an upright pivot pin 53 welded in position at its opposite or aft end;

A pair of rigid accessory support collars 54 and 55 journaled on the opposite ends of pivot pin 53; collar 54 carries a transversely disposed bearing sleeve 56, and a pair of laterally spaced support plates 57; a collar 55 carries a transversely disposed bearing sleeve 58, a heavy horizontal support plate 59, and a vertically disposed strengthening plate 60, welded both to the plate 59 and to the collar 55;

A parallelogram type linkage consisting of an upright post 61 which is rigidly secured as by welding to the spaced vertical plates 30, 31 (FIG. 3), as well as to the bottom plate of the housing 29; a pair of laterally spaced upper links 62 and 63, having ends pivotally connected to post 61 by a transverse pivot pin 64, and opposite ends pivotally connected by a transverse pivot pin 65 to the upper support collar 54, the pin 65 being journaled in bearing sleeve 56; a similar pair of laterally spaced links 66 and 67 having adjacent ends pivotally connected at 68 to post 61, and opposite ends pivotally connected at 69 to lower support collar 55;

A lift chain 70 having one end connected at 71 to support collar 54, and its other end connected at 72 to the lower end of post 61, and serving to limit the free downward movement of the parallelogram link arrangement; and A lift cylinder 73 (FIGS. 1 and 2) having an end pivotally connected to box section element 51 at 74, and its opposite end pivotally connected at 75 between the pair of plates 48.

In addition to the above described and enumerated components, my invention includes a means for preventing dirt and clods from being pulled out of the ground slit being formed by the blade, and deposited on the ground surface alongside the slit.

This means consists of a leaf spring type, bifurcated ground presser foot, shown more clearly in FIGS. 4 and 6, and designated as a whole by the numeral 76.

In the embodiment shown this foot 76 consists of a pair of heavy leaf springs 77 and 78, bent to identical configurations, as shown in FIG. 6. Near their lower ends they rigidly carry ground contacting wear plates or shoes 79 and 80, respectively. Their upper ends are secured to horizontal collar plate 59, for relative lateral adjustment thereon, by means of bolts 81 in transversely disposed slots 82. The lower ends of the springs 77 and 78 straddle blade 10, and are positioned so that there is only a very small clearance between the opposite side surfaces of blade 10 and the respective adjacent inner edges of wear plates 79 and 80, as clearly shown in FIG. 4.

*Operation*

With the implement in elevated position above the ground, as shown in FIG. 2, the end of the cable 15 to be laid is pulled from the storage drum 16 and threaded downward through cable guide 14, with the end of the cable projecting a short distance therefrom as shown in FIG. 2.

Valve 43 of the hydraulic system is opened to start hydraulic motor 39. As a consequence the gears 27 and 28 start the reciprocation of blade 10.

Hydraulic lift cylinder 73 is now retracted, which serves to lower blade 10 and the attached cable guide 14 into the ground. The reciprocation of the blade clears the way for the cable guide and the blade and guide assembly assume the upright position shown in FIG. 1. The vehicle is then operated to pull the reciprocating blade 10 and its cable guide through the ground. Proper adjustment of the length of hydraulic cylinder 73 will determine the depth of the slit 17 to be cut by the blade.

Since the cable guide 14 is attached to the blade 10 by the pairs of links 19 and 20, and since the blade 10 is of slightly less thickness than the cable guide 14, the cable guide is "squeezed" between the side walls of the slit 17 which is cut by the blade. This squeezing action of the walls of the slit tends to hold the cable guide stationary while the blade 10 is free to reciprocate vertically. The cable 15 is also squeezed by the side walls of the slit being cut, and is thereby pulled downward through cable guide 14 from the drum 16, and laid at the bottom of the slit 17, as clearly shown in FIG. 1.

During the ground slitting action the wear plates or shoes 79 and 80 of the presser foot 76 slide along the top surface of the ground at each side of the slit 17, preventing the vertical reciprocation of the blade from pulling dirt and clods from the slit and depositing them alongside the slit at the surface of the ground.

When the cable laying function has been completed, the hydraulic cylinder 73 is extended. This pivots the box section element 51, which in turn, through the parallel linkage shown, assisted by the chain 42, lifts the entire implement from the ground into the elevated position shown in FIG. 2.

If the implement suspending vehicle 21 is turned during the ground slitting, cable laying operation, in order to follow a desired cable route, the upright pivot pin 53 (FIG. 7) allows the entire parallelogram linkage to pivot behind the vehicle, thus allowing the ground slitting blade 10 and its associated cable laying guide 14 to travel a curved path behind the vehicle which is substantially the same path as that traveled by the vehicle. In other words the blade is free to "track" behind the vehicle.

Having described the invention with sufficient clarity to enable those familiar with this art to construct and use it, I claim:

1. A vehicle supported implement capable of forming a deep, narrow, continuous slit in the ground and simultaneously laying a cable or other flexible element along the bottom of the slit, said implement comprising:

a generally flat elongated blade, one of its longitudinal edges being a ground slitting edge;

a power driven oscillatory mechanism being rigidly connected to the upper portion of the blade, and provided with suspending means forwardly extending to and pivotally supported vertically by a vehicle, said suspending means being additionally freely pivotal upwardly and downwardly relative to said vehicle to afford movement of said blade in the same direction responsive to a power operation of said oscillatory mechanism;

a generally flat elongated cable guide and feeder through which a cable may be continuously fed longitudinally;

vertically swinging rigid links spaced one above the other, each link being pivotally secured at one end to the guide and feeder, and at the opposite end thereof to the trailing edge of the blade, so that both the blade and the guide travel in and along a ground slit formed by the blade, said links being the sole support of said guide and feeder and affording free upward and downward movement of the blade independent of any similar movement of the guide and feeder, upon the power operation of said oscillatory mechanism.

2. The implement described in claim 1 in which the implement suspending means incorporates means for elevating the implement to raise the blade above ground surface, and for lowering the implement to position the major portion of the blade length below the ground surface in a generally upright ground slitting position, 3. The implement described in claim 1 in which the implement suspending means includes a generally upright pivotal connection to the vehicle at a location spaced forward of the ground slitting edge of the blade, thus affording a free tracking path for the ground-engaged blade as the vehicle turns.

4. The implement described in claim 1, and
a bifurcated ground presser foot secured to the implement suspending means in a position to closely straddle the blade as it is reciprocated to slit the ground, and to press down and slide along the surface of the ground being slit, alongside each side surface of the blade.

5. The implement described in claim 1 in which the blade is provided with an internal longitudinally disposed duct;

spaced ports in the blade wall affording egress of liquid from said duct as the blade is reciprocated to slit the ground;

and means at the upper end of said blade for introducing a lubricant into said duct.

6. The implement described in claim 1, and
means connected to and supported by the implement suspending means for storing and continuously feeding a cable or other flexible element downward through the cable guide and into and along the bottom of a ground slit as the blade performs its ground slitting task, the side walls of the slit gripping the cable frictionally to pull it through the cable guide as the implement supporting vehicle traverses the ground.

References Cited

UNITED STATES PATENTS

| 3,060,696 | 10/1962 | Lang | 61—72.6 |
| 3,175,368 | 3/1965 | Tibbits | 61—72.6 |
| 3,250,077 | 5/1966 | Ede | 61—72.6 |

FOREIGN PATENTS

| 555,954 | 8/1932 | Germany. |
| 629,544 | 5/1936 | Germany. |

EARL J. WITMER, *Primary Examiner.*